US008335732B2

(12) United States Patent
Dayanim

(10) Patent No.: US 8,335,732 B2
(45) Date of Patent: Dec. 18, 2012

(54) SECURITY PRICING METHOD AND SYSTEM

(76) Inventor: Joshua Farzad Dayanim, Merion Station, PA (US)

( * ) Notice: Subject to any disclaimer, the term of this patent is extended or adjusted under 35 U.S.C. 154(b) by 292 days.

(21) Appl. No.: 12/756,241

(22) Filed: Apr. 8, 2010

(65) Prior Publication Data

US 2010/0306129 A1 Dec. 2, 2010

Related U.S. Application Data

(60) Provisional application No. 61/181,575, filed on May 27, 2009.

(51) Int. Cl.
*G06Q 40/00* (2012.01)
(52) U.S. Cl. ........................................................ 705/35
(58) Field of Classification Search ............... 705/35–45
See application file for complete search history.

(56) References Cited

U.S. PATENT DOCUMENTS

| | | | |
|---|---|---|---|
| 6,772,136 B2* | 8/2004 | Kant et al. ................ | 706/50 |
| 7,386,500 B1* | 6/2008 | Payne ...................... | 705/37 |
| 7,672,889 B2* | 3/2010 | Brooks ..................... | 705/36 R |
| 7,991,672 B2* | 8/2011 | Crowder ................... | 705/36 R |
| 2002/0010667 A1* | 1/2002 | Kant et al. ............... | 705/35 |
| 2003/0115128 A1* | 6/2003 | Lange et al. .............. | 705/37 |
| 2003/0236738 A1* | 12/2003 | Lange et al. .............. | 705/37 |
| 2005/0177485 A1* | 8/2005 | Peter ........................ | 705/35 |
| 2008/0294565 A1* | 11/2008 | Kongtcheu ............... | 705/36 R |

FOREIGN PATENT DOCUMENTS

EP    1 178 416 A1 *  6/2002

OTHER PUBLICATIONS

Wilmott, Phil. The Best of Wilmott vol. 2. 2006. John Wiley and Sons Ltd Publisher.*

* cited by examiner

*Primary Examiner* — Kambiz Abdi
*Assistant Examiner* — Stephanie M Ziegle

(57) ABSTRACT

A method for pricing securities or valuing assets that generates prices and related price indicators using a partial differential form of the price equation and a conservation of capital principal. Price indicators including price channel, divergence, support level, velocity, and momentum provide into the price spread and appreciation potential of a security or asset, direction and intensity of price movement, and investor sentiment. Price indicators can be used to identify, analyze, and recommend investment opportunities and to create and manage an investment portfolio.

21 Claims, 9 Drawing Sheets

Security Pricing Tool

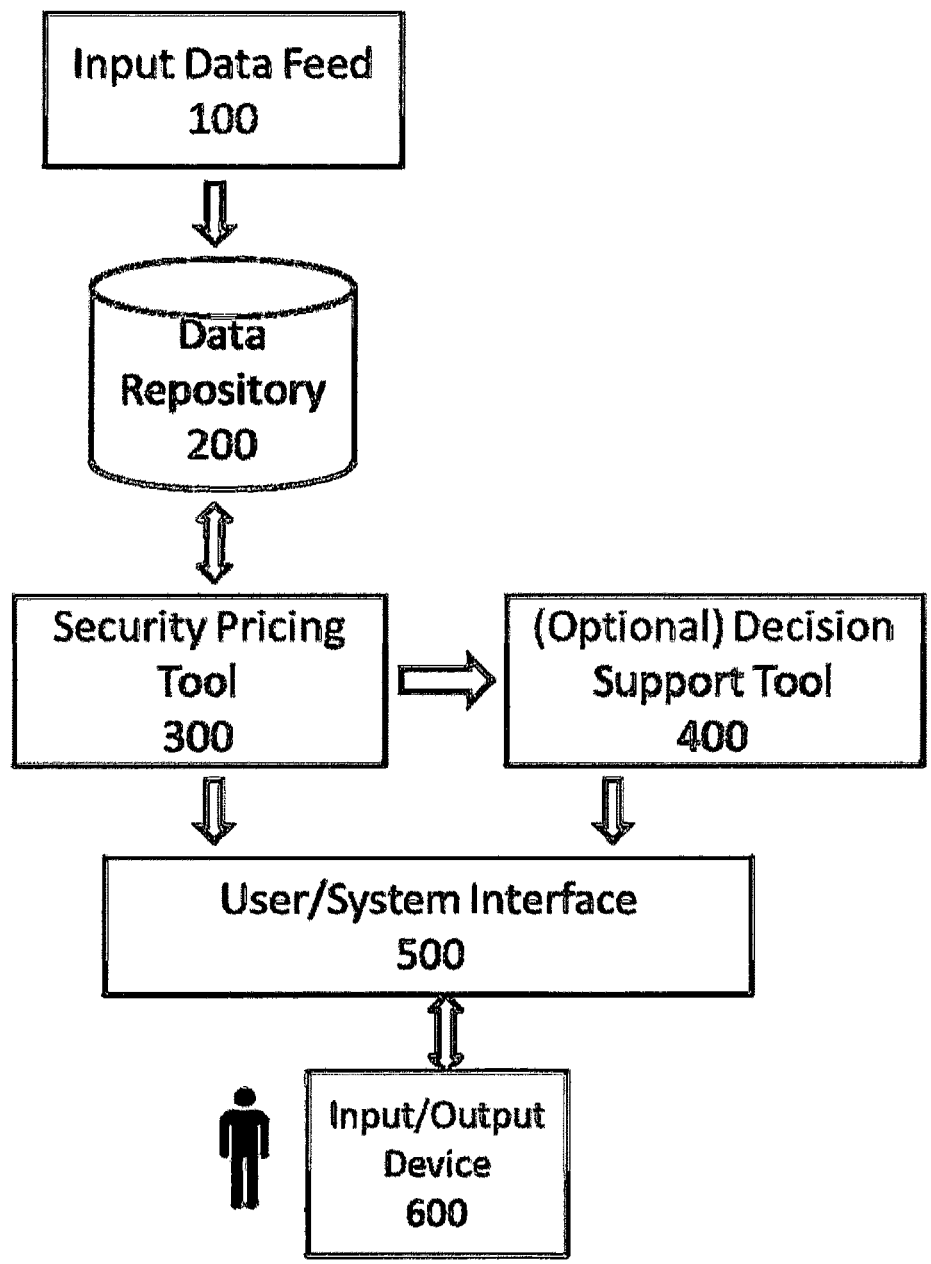
FIG 1. Security Pricing Method

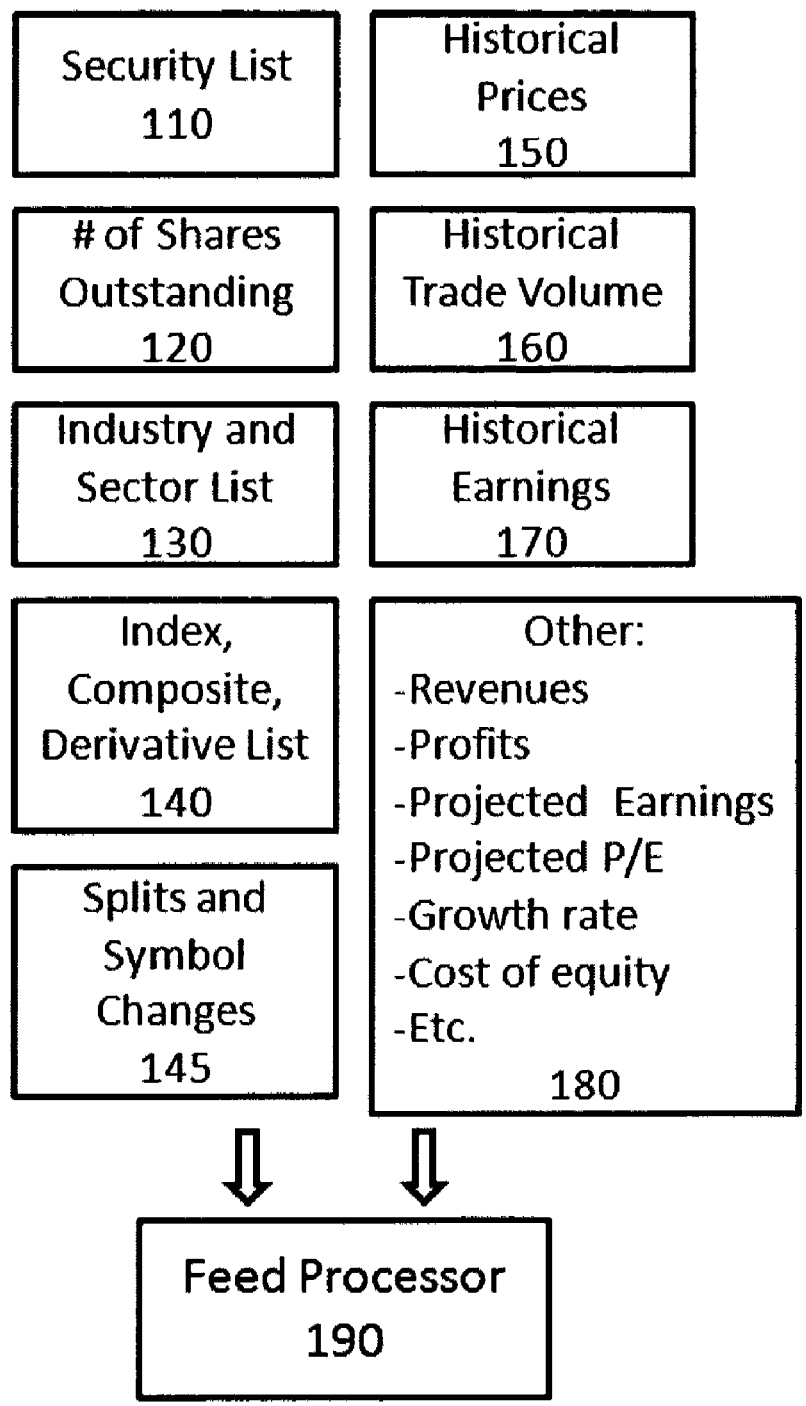
FIG 2. Input Data Feed

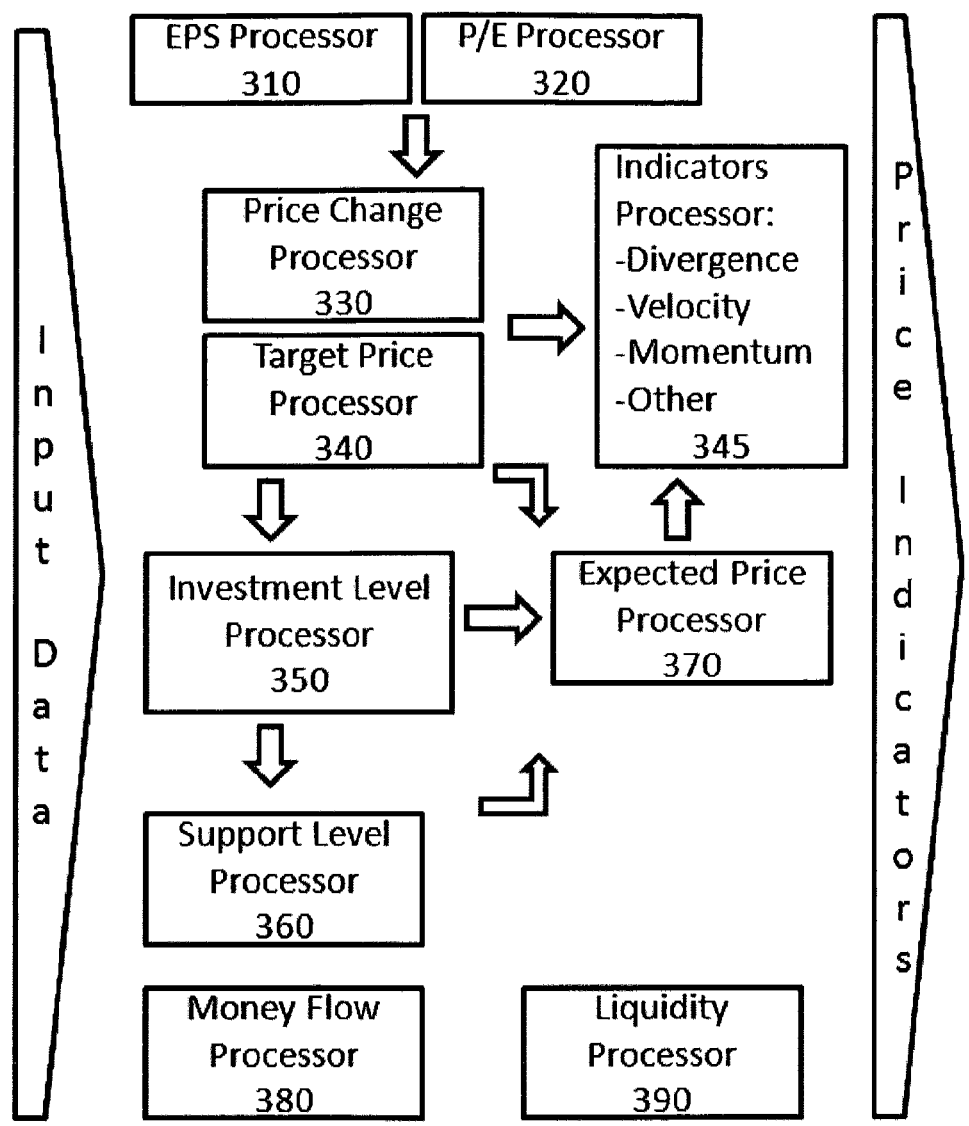
FIG 3. Security Pricing Tool

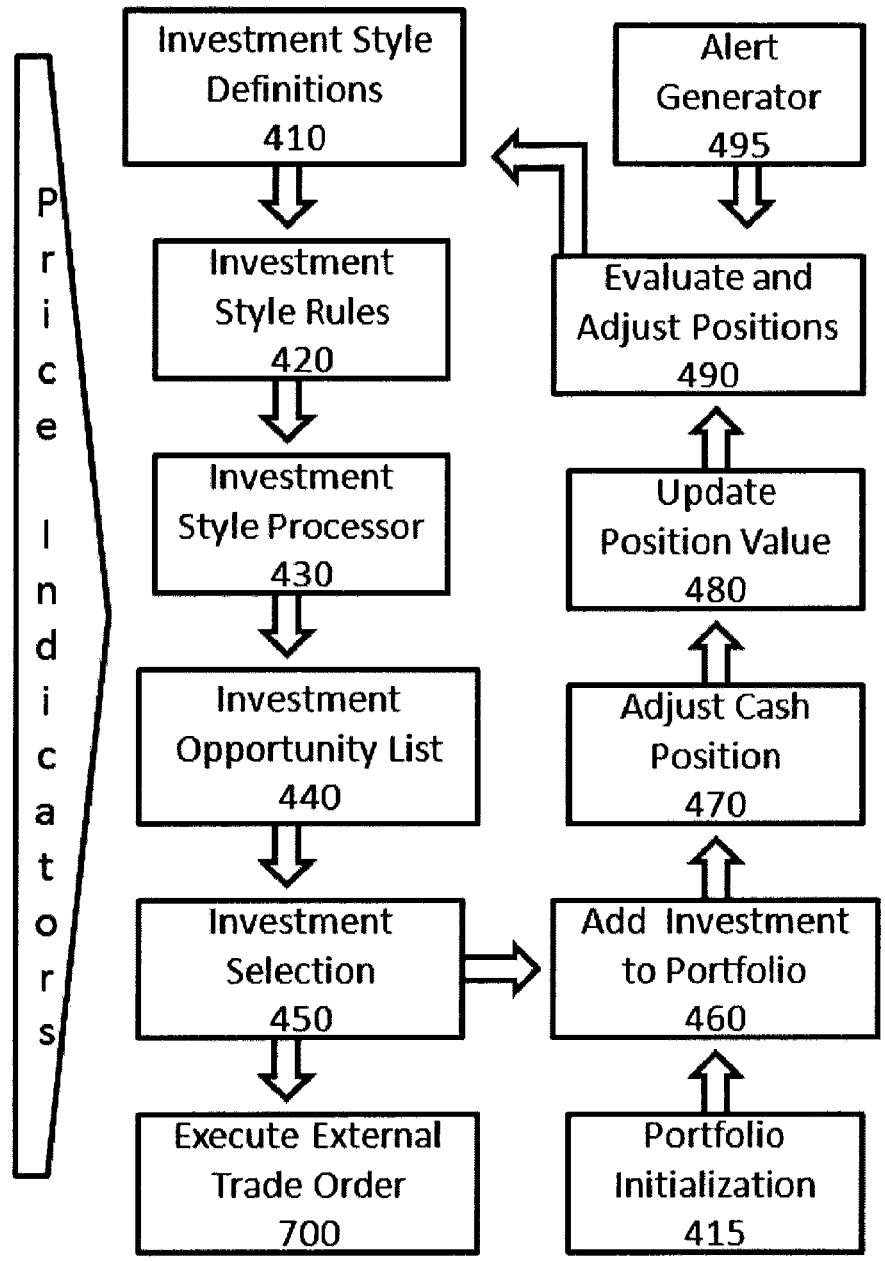
FIG 4. Decision Support Tool

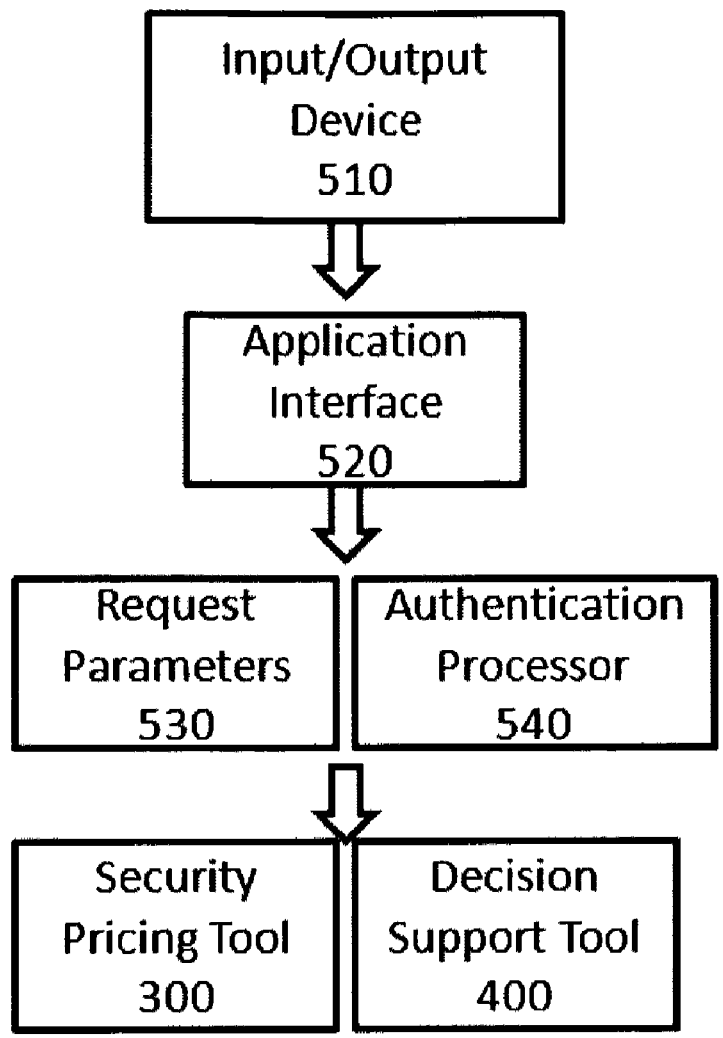
FIG 5. User/System Interface

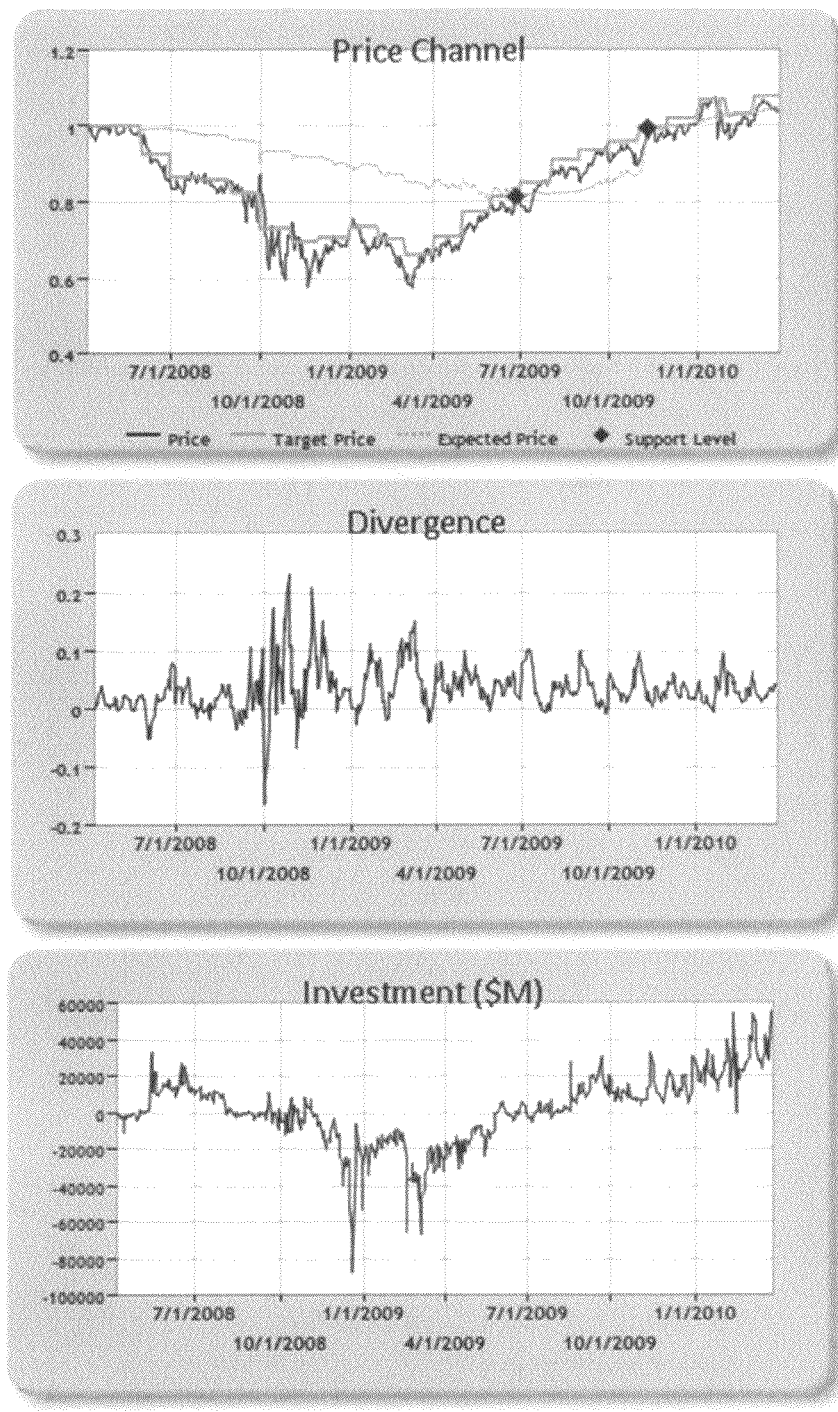
FIG 6. Sample Indicators

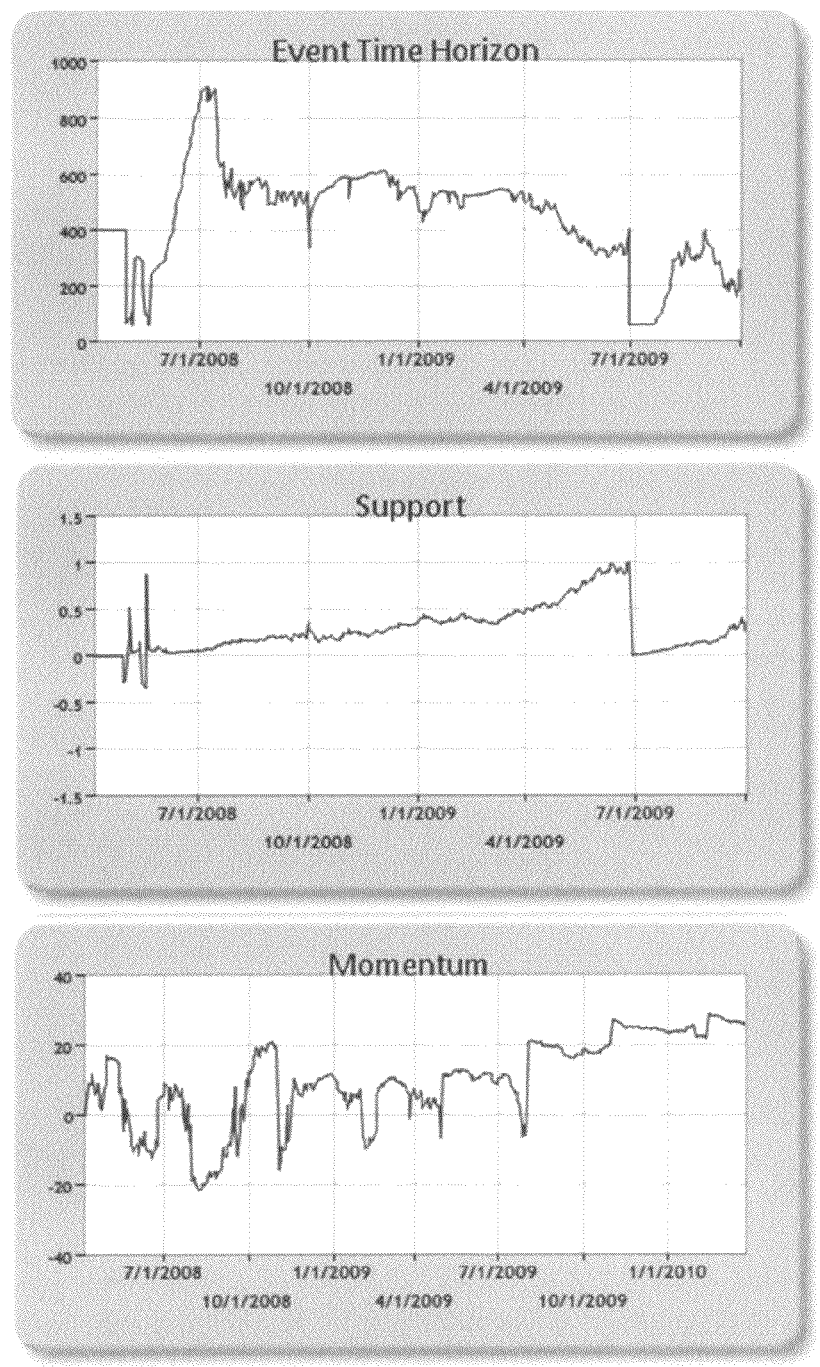
FIG 7. Sample Indicators

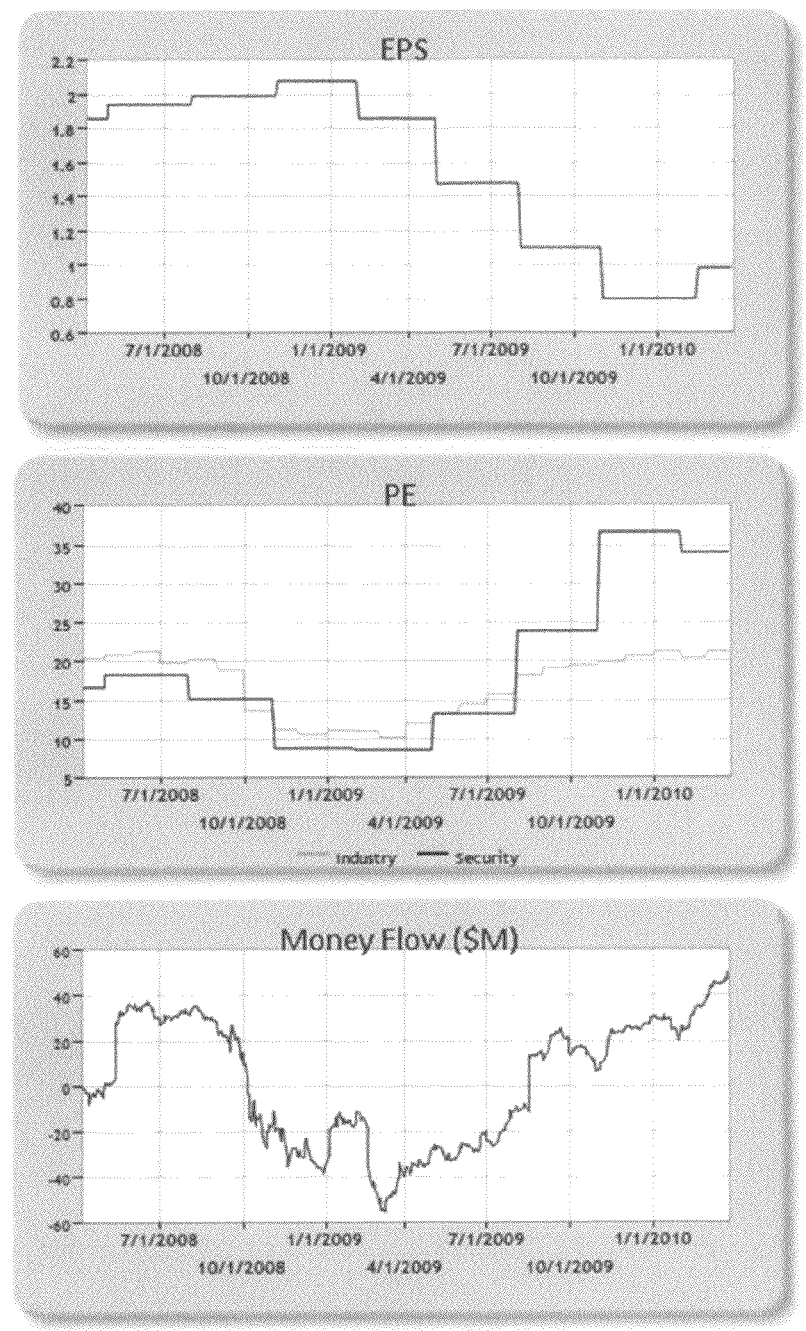
FIG 8. Sample Indicators

FIG 9. Sample Portfolio Styles and Investment Opportunities
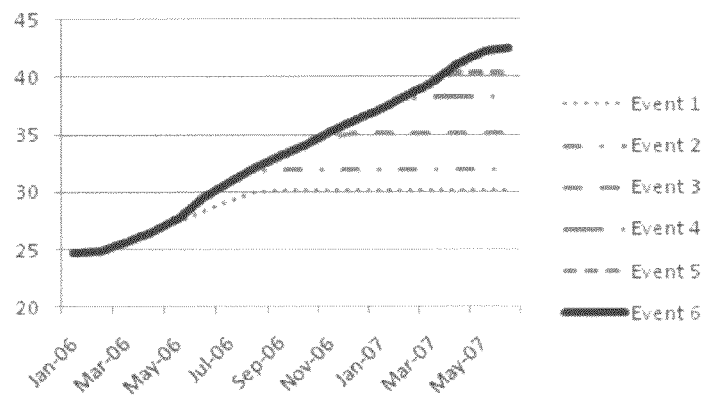
FIG 10. Sample Superposition of Expected Price and Target Price Levels for Multiple Overlapping Events

SECURITY PRICING METHOD AND SYSTEM

CROSS-REFERENCES

This application is based on U.S. Provisional Application No. 61-181575 filed on May 27, 2009 which is hereby incorporated by reference in full.

BACKGROUND ON THE INVENTION

1. Field of the Invention

The present invention consists of a method for using a general-purpose computer and one or more processors to estimate target pricing and price indicators for traded securities, such as stocks, bonds, and related composites and derivatives including indices, funds, and options. Such methods are commonly used to identify market price disparity, anticipate price movements, guide investment timing or strategy, initiate or recommend a trade, hedge, or hold position in a security, set a target price level, analyze price stability and potential for up or down price swings, gauge investor or market sentiment, manage an investment portfolio, or conduct investment analysis and decision support activities.

2. Description of the Prior Art

As known in prior art, price of a security may vary pursuant to an earnings surprise, changes in growth rate, changes in attractiveness of an industry or asset class, shifts in market liquidity and availability of buyers and sellers, market movements based on macroeconomic factors such as inflation or interest rate changes, or other significant security, industry, or market news and events.

Existing security pricing models commonly utilize fundamental analysis or technical analysis in order to determine a target price or anticipate a price movement. Fundamental analysts often measure price using a discounted cash flow model of expected future earnings, relying on assumptions regarding projected growth rates, and taking into consideration business factors such as historical security and industry performance, business risk and debt level, management team, and competitive position. Thus, price evaluation is based on business performance and assumes that a forecasted target price will be eventually reached. However, fundamental analysis often results in differing projections based on growth rate and annuity model assumptions, and suffers from subjective weighting and application of multiple factors affecting price, with some of the available information at times being out of date.

Technical analysis relies on chart pattern recognition and attempts to anticipate direction of a price movement through comparison with similar historical chart patterns. This approach assumes that market price reflects all relevant information about a security, that price moves in trends driven by investor sentiment, and that history and observed price patterns repeat themselves. Technical analysis utilizes various indicators which typically consist of price and trade volume transformations in order to identify a trend and forecast future price movements. Technical analysis remains controversial and is generally viewed as inconclusive as it can result in contradictory predictions depending on the specific indicators or approach that is utilized.

A number of security related attributes and ratios are commonly used including share price, earning per share (EPS), price to earnings ratio (PE), daily trade volume, money flow rate, market capitalization, and support or resistance level. In general, terminology can vary across different security types but parallels can be drawn for use with the security pricing method. For example, in case of bonds, share price may be replaced with the open market value, and earnings may be substituted by a product of coupon rate and par value. Similarly, in case of funds, earnings may be evaluated as the aggregate or proportionally weighted earnings of the underlying securities in a fund. The method and system can be further applied to other markets and exchanges for commodities, goods and services by drawing appropriate parallelisms and substitutions.

The concept of support or resistance level is utilized in technical analysis as a price level that establishes the low or high price point respectively in the event of a falling or rising price trend. A common practice is to assume that the price movement trend will halt and potentially reverse at the point or within a close proximity of this level. However, no underlying mechanism has been identified and there is no assurance that a support or resistance level will in fact successfully hold.

Several security investment styles are in common use, including "value" and "momentum" based investing. Value investing focuses on securities that appear undervalued due to what an investor may consider as temporary and reversible factors, and the premise that a security's price will surge once the conditions change. Momentum investing, on the other hand, relies on identifying a rising or falling price trend and leveraging the wave of positive or negative investor sentiment respectively, on the assumption that a security's price movement maintains its direction while the investor sentiment remains unchanged.

Accordingly, what is needed is a security pricing method that combines the strengths of fundamental analysis and its use of historical data about a security, together with the strengths of technical analysis in the form of price indicators, without material reliance on subjective, variable, uncertain, unexplained or speculative elements. Such method shall utilize historical security data and optional projected estimates, such as quarterly earnings estimates, as input into a security pricing model, which in turns generates target price and price indicators for a security.

SUMMARY OF THE INVENTION

The present invention provides a method for using a general-purpose computer and one or more processors and implementing a security pricing tool. Accordingly, a first aspect of the present invention is a method of creating the security pricing tool. The method includes receiving historical and optional projected data related to a security, developing a security pricing model, and creating a security pricing tool that is capable of taking into account the received data and the security pricing model in order to generate target pricing and price indicators for a security. The input data includes for example historical and projected data such as price, trade volume, earnings, outstanding shares, industry association and related security performance measures and ratios. The price indicators include for example Divergence—an indicator of potential price gain/loss opportunity; Velocity and Momentum—indicators of price movement intensity; Investment Level and Money Flow—indicators of investor sentiment; Support Ratio—an indicator of price stability; and Liquidity—an indicator of availability of buyers and sellers for a security.

A second aspect of the present invention is a computer program product that when executed by a general purpose computer with one or more processors implements the security pricing tool. The computer program product provides an interface for receiving input data; utilizes an optional data repository for storing data received from the input data feed, entered using the provided computer user interface; a security pricing tool for processing input data and generating security target price and price indicators for a plurality of scenarios and time horizons; and a computer user interface for interacting with an external user or client system. The computer user interface provides external users and client systems with expected and target security prices and price indicators based on optional user input parameters that may include for example security name or symbol and a specific date or date range under consideration.

An optional decision support tool utilizes received input data and generated target price and price indicators in order to identify investment opportunities and provide investment recommendations for a plurality of investment strategies. The decision support tool further extends the computer user interface and presents users with investment analysis and recommendations based on a plurality of user or system defined investment objectives and styles, thus enabling users to identify investment opportunities, track performance of securities over time by comparing forecasted prices with actual prices, execute an investment strategy, or track the performance of a portfolio of holdings including start-up cash positions and gains/losses from opening and closing trade positions. Such trading activity may be simulated within the decision support tool and further enacted at the user's option by the way of generally available external brokerage and trading services.

The security pricing tool and the related decision support tool are general and flexible enough to provide price estimation, forecasts and investment recommendations with varying degrees of available data. In particular, the security pricing tool produces current expected price and target price estimates using available data, and then modifies those price estimates by incorporating any new data as it becomes available. In this way, it functions continuously or at preset data refresh intervals to update and alter price recommendations and targets to reflect the most recently acquired data. Optionally, the security pricing tool can generate price forecasts by incorporating consensus analyst estimates and projected data, such as estimated future quarter earnings, and the information is used as additional input into the security pricing tool.

While the invention uses a general-purpose computer for estimating and forecasting prices as described above, it also can be used as a support, training, or simulation tool. Specifically, the security pricing tool can be used to train personnel to identify and monitor security prices, track the success of various investment strategies, and incorporate the findings in refining the security pricing tool and components as well as the interpretation and use of the price estimates and forecasts and the related price indicators.

The invention is applicable as a general method to a wide range of exchanges, and may be applied where there is a market for trading securities, commodities, goods or services. Other objects, advantages, and features of the present invention will become apparent after review of the herein presented Brief Description of the Drawings, Detailed Description of the Invention, and claims.

BRIEF DESCRIPTION OF THE DRAWINGS

Referring now to the drawings in which like reference numbers represent corresponding parts throughout:

FIG. 1 is a block diagram of components comprising a typical security pricing method;

FIG. 2 is a block diagram of the input data feed and its components;

FIG. 3 is a block diagram of the security pricing tool and its various processors, estimators, forecasters, indicators, and components;

FIG. 4 is a block diagram of an optional decision support tool illustrating its various components and processors;

FIG. 5 is a block diagram of the user or client system interface illustrating the interaction of a user or client system with the security pricing and decision support tools;

FIGS. 6-8 are examples of security price indicators generated by a sample embodiment of the security pricing tool with EPS and PE indicators displaying discrete change events;

FIG. 9 is an example of portfolio styles within a decision support tool and sample investment opportunities for a specific style;

FIG. 10 is an example of additive superposition for expected price movement and displays adjusted target price levels for multiple overlapping events.

DETAILED DESCRIPTION OF THE INVENTION

At a high level, the security pricing method can be envisioned as depicted in FIG. 1. The input data feed 100 may utilize a computer or electronic interface to interact with an external data source, or alternately input data may be manually loaded in an electronic format such as a file, or via an operator input device such as a keyboard. In one embodiment, input data is received by a feed processor 190 and stored in the data repository 200 in its original or a modified form optimized for use by the security pricing tool 300. The input data is processed by one or more processors and components in the security pricing tool 300 and an optional decision support tool 400 and generated data is stored in the data repository 200 at various processing stages for access by users or external client systems through the provided user interface 500. In an alternative embodiment, the storage repository may be eliminated altogether by using a continuous or on-demand input data feed, and users are presented directly with the resultant output from the security pricing or decision support tools.

The user/system interface 500 provides a mechanism for external users and client systems to input optional request parameters, such as security name and date, utilizing an input/output device 600 which may consist of a general-purpose computer, a portable device supporting the user interface such as a laptop, PDA, tablet, smart phone, or other communication enabled device, or a simple keyboard or printer. The user/system interface may use a wired or wireless connection, traverse the Internet, use a cellular network connection, or rely on other intermediary electronic transmission and communications media, thus allowing an electronic dialogue between the user and the security pricing tool. The user interface may be active, where the user may access the security pricing tool and request a response, or alternately passive, where a response in forwarded to a user via an electronic or printed media such as email, text message, phone call, display screen or printer.

Input Data Feed

As depicted in FIG. 2 the security pricing tool receives input data feed 100 in the form of a listing of covered securities 110, historical data for one or more securities including for example earnings reports 170; daily open and close prices 150; daily trade volume 160; number of outstanding shares 120; listed exchange; industry and sector association 130; listing or participation in various indices, composites, or derivative instruments 140; share splits or changes in symbol name or exchange membership 145; and optional projected earnings and other fundamental data and ratios used by the security pricing tool and the optional decision support tool 180. Input data may originate from a multiplicity of external sources, and may be delivered in a multiplicity of ways and forms including for example electronic or manual data transfers; continuous feed, on-demand or batched data; raw or processed data format, and historical data or projected estimates. The input data is received by a feed processor 190 and stored in the data repository 200 in its original or a modified form optimized for use by the security pricing tool. Additionally, the feed processor updates stored data and inserts new data into the storage repository as it becomes available or on a continuous or pre-defined refresh schedule. In one embodiment, portions of the data are stored and optimized using multi-dimensional database methods for flexible, high performance access and analysis. In an alternate embodiment, the storage requirement is minimized or eliminated for example by employing a continuous or on-demand feed.

Security Pricing Tool

As depicted in FIG. 3 the security pricing tool 300 consists of a general-purpose computer and one or more processors that manipulate input data, implement the security pricing model, generate target and current expected prices and price indicators that are optionally stored in the data repository 200 at various processing stages and selectively presented to the user application interface 500 and the decision support tool 400. While the various processors are enumerated individually or as a group in the presented figures, they may be combined, split, or re-arranged in various embodiments of the security pricing tool.

The EPS processor 310 generates annualized or periodic earnings per share values continuously or at specific earnings release date, or "event" date, where a change in the earnings value is expected. In one embodiment, the EPS processor generates annualized EPS values on a quarterly basis, for a security with quarterly earnings release schedule, by adding the reported EPS values for the current and the preceding three quarters. In an alternate embodiment, annualized EPS values may be generated using a mix of historical data and projected estimates for example by adding the prior two quarterly earnings and the projected earnings for the next two quarters. Alternate embodiments may use varying frequency or intervals of time for generating EPS values, use alternative formulations for determining EPS values, use projected data, or substitute EPS with related measures or financial ratios for example net income, profit margin, return on equity (ROE) or return on assets (ROA).

The PE processor 320 generates values for PE ratio continuously or at preset time intervals, or "event" dates, where a change in PE ratio may be estimated for a multiplicity of measurement scenarios and time horizons. In one embodiment, the PE ratio event dates are set to coincide with the EPS event dates and the PE ratio is measured by averaging the prior quarter's daily PE ratios. Alternate embodiments may use varying frequency or intervals of time to generate values for the PE ratio, use alternative formulations, or use projected data.

For example, such embodiments may use a daily, weekly or monthly time interval for event dates, may use a 30 day running average to measure PE ratio, may incorporate earnings growth rate and cost of equity in estimating PE ratio, may incorporate industry or sector PE ratios in estimating PE ratio, may use analyst quarterly projections for price and EPS and estimate PE ratio by dividing projected price by projected EPS value, or may substitute related measures or financial ratios for example PE Growth (PEG) ratio.

The Price Change Processor 330 utilizes annualized or periodic EPS values and expected PE ratios, and calculates the change in their values denoted as $\Delta EPS$ and $\Delta PE$ for each event date. As described, a multiplicity of options are available for selecting event dates, for example by using earnings release dates for a security, by using a fixed time interval such as a quarter or a month, or by using operator or user selected dates. The processor then generates an expected price change for a security for each event date, using the price formulation $P=EPS*PE$ and a differential equation:

$$\Delta P = \Delta EPS * PE_0 + EPS_0 * \Delta PE \quad (1)$$

wherein $\Delta P$ represents expected change in price resultant from the change in EPS or PE ratio, and $EPS_0$ and $PE_0$ represent starting values for EPS and PE at a point in time immediately preceding the event. This process is repeated for each event date, resulting in a series of expected price adjustments corresponding to the various event dates. In alternate embodiments of price formulation, a similar differential treatment may be applied to various substitute factors affecting price of a security in order to determine the expected price change.

The Target Price Processor 340 uses an initial starting price point corresponding to a startup date provided through the computer user interface in the form of an input parameter, preset by an operator of the security pricing tool, or determined by the security pricing tool to be a fully supported price level as detailed later in this description. In a perfect embodiment, the starting price point optimally exhibits good price stability and limited price fluctuations for the immediately preceding and pursuing time periods of sufficiently long duration, for example lasting several months or several weeks. In alternate embodiments, this starting price point stability may be relaxed, for example by shortening the duration of stable time periods around the starting price, by setting the starting price point to a date sufficiently far enough in the past, or by starting from an identified fully supported price level. The processor then generates a target price pursuant to each event by adding the price immediately preceding the event to the expected price change for the event, as follows:

$$P_T = P_0 + \Delta P \quad (2)$$

wherein $P_T$ represents the new target price. This process is repeated and the target price is adjusted for each successive event, resulting in a series of target price values corresponding to the various event dates.

The Investment Level Processor 350 utilizes input data for trade transactions including for example the number of traded shares and per share gain/loss for each individual trade transaction, with the latter measured as the difference between the sell price and the seller's original cost basis or purchase price for a share, in order to generate the amount of new investment flowing into a security, using the equation:

$$\text{Investment Level}(t) = \Sigma_{n=1}^{N} \{s_n * \Delta P_n\} \quad (3)$$

wherein $s_n$ is the number of shares traded in a single trade transaction n, $\Delta P_n$ is the sellers' per share gain/loss, and N is the number of transactions or trades completed since an event's onset or start date measured at elapsed time t from the event's onset.

As some of the required data for this calculation may not be readily available, such as the cost basis of each trade, the investment level can be estimated using aggregate measures. In one such embodiment, the investment level is estimated by summing the product of daily trade volume and the corresponding change in a security's daily closing price. Alternative embodiments may employ differing approaches including for example the use of opening or mid-day prices, hourly or real-time transaction data, varying means and methods of estimating the investment level using individual or aggregate trade data, or substitute measurements that effectively relay similar investment information. This calculation may be performed continuously or repeated at a preset interval and passed on to the Support Level Processor.

The Support Level Processor 360 measures the level of support for the target price by comparing the investment level since the event's onset to the change in market capitalization. The change in market capitalization is first calculated using the equation:

$$\Delta MC = S_{Total} * \Delta P \qquad (4)$$

wherein $S_{Total}$ is the total number of outstanding shares for a security. In one embodiment a support ratio is measured by dividing the investment level into the change in market capitalization, using the following equation:

$$\text{Support Ratio}(t) = \frac{\text{Investment Level}}{\Delta MC} \qquad (5)$$

where the support ratio approaches 1 as the investment level approaches the change in market capitalization, and a fully supported price level is established. The support level indicates a point of price stability as the amount of new investment in a security reaches the change in its market capitalization, utilizing a conservation of capital principal. The support level calculation is performed continuously or at preset intervals and is passed on to the Expected Price Processor. In alternate embodiments, the total of number of shares outstanding may be substituted with a diluted number of shares or similar substitute measures.

The Expected Price Processor 370 utilizes the target price and support level measurements, also referred to as price indicators, to generate the expected price of a security at a specific point in time. The expected price is estimated using the received input data and generated target price and price indicators. In one embodiment, an Event Time Horizon is first measured as an indicator of the time duration from the onset of an event until the support ratio reaches the value of 1. The Event Time Horizon in turn may be estimated using a multiplicity of methods. In one such embodiment, the event time horizon is estimated for a point in time as a ratio of the elapsed time t from the event's onset over the measured support ratio at time t, that is:

$$\Delta T = \frac{t}{\text{Support Ratio}(t)} \qquad (6)$$

wherein $\Delta T$ indicates the event time horizon. The resultant event time horizon is continually measured and the estimate is improved with each new data point. In an alternate embodiment, the event time horizon may be estimated by applying linear regression to previous measurements of elapsed time and estimated support ratio, with the event time horizon estimated as the slope of the resultant line. In another embodiment, the event time horizon may be estimated using a previous event's time horizon or an average value across multiple historical events' time horizons for a security. Alternate embodiments may use a mix of current and previous event time horizons, or utilize other industry, sector, or market averages.

The expected price at time t is then estimated by multiplying the expected price change by an adjustment factor at elapsed time t and then adding the result to the starting price, using the equation:

$$\text{Expected Price}(t) = P_0 + \Delta P * f(t) \qquad (7)$$

where f(t)=Support Ratio (t) for the special case of a straight line price movement.

Alternate embodiments may utilize non-linear movement patterns to generate expected price, or may introduce other factors including for example a variable trade volume that will distort or modify the movement pattern. The expected price incorporates the investor sentiment exhibited through active trading and investment in a security. The boundaries and the area between the Target Price and Expected Price present a Price Channel indicator that portrays the divide between the target price and the investors' response to an event.

The Indicators Processor 345 generates additional price indicators, including Divergence, Velocity, and Momentum indicators. Accordingly, the Divergence indicator is calculated as the difference between the observed market price and the target price of a security divided by the observed market price at elapsed time t, using the equation:

$$\text{Divergence}(D) = \frac{\Delta P_T}{P} \qquad (8)$$

wherein $\Delta P_T = P_T - P$, and $P_T$ is the target price. Divergence represents the gain/loss opportunity and potential return on an investment in a security at a point in time. It may be used to identify and select investment opportunities and provide investment recommendations.

The Velocity indicator is closely related to the Divergence indicator and is calculated using the equation:

$$\text{Velocity} = \pm \sqrt{\frac{2|\Delta P_T|}{P}} \qquad (9)$$

wherein the vertical bars indicate an absolute value and the sign reflects the direction of movement. Velocity measures the direction and normalized speed of price movement.

The Momentum indicator provides a measurement of the intensity behind a change in price attributed to an event, and is measured using the equation:

$$\text{Momentum} = \pm \sqrt{2P|\Delta P_T|} \qquad (10)$$

Velocity and momentum indicators are measured continuously or at preset time intervals, and may be used to identify investment opportunities for select investment styles, for example for momentum investing where the rate of price change may indicate a fast moving security. These and other indicators are commonly estimated for select observation or measurement points. In alternate embodiments, these point estimates are smoothed out for consistency or to capture trends, for example by using a 30 day running average, or related or substitute measures are used, for example squared values of the equation results. The prescribed volume and momentum indicators differ from commonly used terms with similar titles that simply represent a qualitative statement regarding observed price movements or for example measure velocity as the observed change in price divided by the observation time period.

The Money Flow Processor 380 calculates the aggregate amount of capital flowing into a security from a selected starting point in time, and is an indicator of investor sentiment and support for the expected price change. In a preferred embodiment, the money flow is calculated by adding the value of all buy trades and subtracting the value of all sell trades over the covered period. Where the input data does not contain sufficient detail, the money flow can be estimated by using alternate methods. In one embodiment, the daily trade volume is multiplied by the change in the daily close price from the preceding day's close, and then summed for all days within a select time period. Other embodiments may use varying time periods for example hourly or weekly, or alternate intervals for measuring price such as opening price or mid-day price. The prescribed money flow indicator differs from a commonly used measure with similar title that simply multiplies the number of traded shares by share price. A key aspect of the present indicator is a measurement of the difference in the buy and sell trade transaction amounts.

The Liquidity Processor 390 calculates the aggregate number of trades for a selected period of time over the total number of outstanding shares, and is an indicator of the market activity level in a security. In one embodiment, this is presented as a sum of daily trade volumes during the prior month divided by the number of outstanding shares. The liquidity indicator measures ease of trading in a security and the competitiveness of bid and ask prices, with low numbers presenting a poorly traded and low liquidity issue with a potential liquidity risk. In alternate embodiments, the liquidity indicator may be measured over varying time periods including for example a day or a week, presented as a running average, or replaced with substitute measures, for example share turn-over rate is used as the time period for which the aggregated number of traded share equals the number of shares outstanding for a security, with the latter measure standing inversely proportional to the liquidity indicator. The prescribed liquidity indicator differs from a commonly used term with similar title that may represent the number of shares available for trading, the daily trade volume, or a financial ratio of an entity's assets over its liabilities. A key aspect of the present indicator is the ratio of the trade volume to the number of outstanding shares, which when inversed yields the share turn-over rate.

The aforementioned processors work continuously or at preset time intervals to calculate the target price, expected price, investment level, support level, divergence, and other detailed price indicators. As described, for a single event, the support level approaches 1 with additional new investment until a fully supported price level is attained. At this point the Expected Price reaches the Target Price. In an optimal embodiment of the security pricing tool, the support level processor then communicates with other processors the completion of the current event's life cycle and issues instructions to re-initialize. The starting price point is then reset to the recently attained fully supported price level and time. In alternate embodiments, the starting price point and re-initialization sequence may be varied for example to coincide with the onset of a new event or an observed patterns of price stability.

A multiplicity of price movement scenarios can arise and the security pricing tool is configured to respond in a predetermined manner. These scenarios include for example: a) a security fails to achieve an adequate level of investment required to attain a fully supported price level, b) new events are encountered prior to a security reaching the support level from a preceding event, and c) price continues to move beyond the target price after the support level is reached. In an optimal embodiment of the security pricing tool, if a new event is encountered prior to price reaching a fully supported level for the preceding event, the processors "superpose" these consecutive and overlapping events and apply an addition operand to account for the cumulative effect of these events. As such, a new target price is iteratively established at each event point by calculating and adding the expected price change from a new event to the preceding event's target price which acts as the starting price for the new event. The price indicators are also adjusted to reflect the revised target price and take into consideration the entire chain of overlapping events. Alternate embodiments may apply varying superposition processes or rules, for example use the current trading price of a security at an event's onset to measure the expected price change for a new overlapping event, or attempt to treat each event separately and apply superposition by adding values at a later stage in processing, or use alternative operands such as a weighted summation.

The security pricing tool generates target and expected prices and described price indicators that are presented to the user interface and the optional decision support tool. This output data may be used as estimates or recommendations regarding the price spread and investment potential of a security, its price movement direction and intensity, and the investor sentiment and market participation level.

Decision Support Tool

As depicted in FIG. 4 the optional decision support tool 400 consists of a general-purpose computer and one or more processors that receive data from the input data feed and the security pricing tool, defines and implements investment styles and rules, and provides processes for security identification, recommendation, selection, portfolio creation and management, performance analysis and tracking, and optional linkage to external trading and order fulfillment systems. A key aspect of the decision support tool is the use of target pricing and price indicators generated by the security pricing tool.

The decision support tool uses a general-purpose computer and one or more processors to identify securities that match one or more defined investment styles and provides investment recommendations via the user interface. In one embodiment, the administrator of decision support tool defines a multiplicity of investment styles 410 and the supporting investment rules 420, which may be updated or expanded over time, and include for example "value", "momentum", and "trending" styles. Investment style rules utilize price indicators generated by the security pricing tool, including for example divergence, money flow, support level, and momentum. In an alternate embodiment, the investment style rules may be modified dynamically based on input parameters or user selections received through the provided user interface, and the investment styles are customized according to user preferences.

The investment style rules are implemented by an investment style processor 430 which generates an investment opportunity list for each selected style. The style rules consist of one or more threshold values, trends such as direction and speed of movement, patterns such as proximity or number of nearby support levels, and use one or more price indicators and received input data. The rules vary according to the investment style selected. An investment style processor implements the rules and generates a listing of securities for each investment style and the level of fitness to prescribed rules, which constitutes the investment recommendations or opportunity list.

Through the user interface, a user or client system can view or retrieve the investment opportunity list 440, and create, manage or track the performance of a portfolio of securities. In one preferred embodiment, the user makes investment selection 450 by creating an investment portfolio 415 and placing selected securities in the investment portfolio 460, and optionally executes trade orders 700 through linkages with one or more external trading systems. The decision support tool adjusts the cash position 470 for the user to reflect changes in the portfolio and security holdings, and regularly updates the portfolio position value 480 based on new input data and updated pricing information. The user can evaluate the positions held in the portfolio and remaining cash, view their performance over time, and make adjustments as needed 490. An optional alert generator 495 can inform user of a condition that requires attention, such as a rapid change in a security's target price or price indicator. The user may then assess the situation and determine a possible course of action, such as close, hold, or open new position in a security. In alternate embodiments of the decision support tool a subset of the prescribed functionality may be implemented, or the security selection and portfolio management may incorporate varying levels of automation including for example an automated trading system that maintains portfolio positions in the top N entries from an investment opportunity list, with N being an integer value preset by an administrator or provided as a user input parameter.

User/System Interface

As depicted in FIG. 5 the security pricing tool provides an interface for a user or external client system via an input/output device 510 for example a keyboard, monitor, printer, mobile communication device, computer system, or computer program connected via a direct wired, wireless, cellular, Internet link, or other communications mechanism. By accessing the application interface 520, the user or client system can navigate, make selections, input parameters 530, and receive data, charts, reports, or other output data generated by the security pricing tool. An optional authentication processor 540 supports the registration of users or clients systems, and validates user credentials when requesting access to the security pricing tool. The user interface supports access to the security pricing tool providing expected and target prices and price indicators in a multiplicity of formats, for example, alphanumeric, encoded, or graphical forms that may include text, list, table, chart, or XML data. The user interface also supports interaction with the optional decision support tool in identifying and selecting investment opportunities, and creating and managing investment strategies and portfolios.

Further optimization and refinements of the security pricing tool and the related decision support tool are possible. Although the present invention is described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method for pricing securities such as stocks, bonds, and related indices, composites, or derivative instruments using a general-purpose computer and one or more processors comprising:
   a. collecting and storing input data including historical data and optional projected data related to one or more securities;
   b. implementing a security pricing tool by said processor based on a security pricing model;
   c. computing by said processor a plurality of scenario prices and price indicators utilizing said input data for a plurality of time horizons for one or more securities as a function of a change in one or more factors affecting a security's price (P) from a group comprising of earnings per share (EPS), price to earnings (PE) ratio, or combinations and variations thereof, using the price equation $P=EPS*PE$ and its partial differential form:

$$\Delta P = \Delta EPS * PE_0 + EPS_0 * \Delta PE$$

wherein $\Delta P$ is the expected price change, $\Delta EPS$ and $\Delta PE$ are measured, estimated, or projected change in earnings per share and price to earnings ratio, and $EPS_0$ and $PE_0$ are starting values for earnings per share and price to earnings ratio for an initial price point ($P_0$), wherein a target price is computed by adding said expected price change to said initial price, using the equation:

$$P_T = P_0 + \Delta P$$

d. computing by said processor a Divergence indicator for a plurality of time horizons as a ratio of the target price spread $\Delta P_T$ over the observed market price at elapsed time t, using the equation:

$$\text{Divergence}(t) = \frac{\Delta P_T}{P}$$

wherein $\Delta P_T = P_T - P$, with $P_T$ as said target price and P as the market price at elapsed time t, where Divergence represents the expected gain/loss opportunity for a security;
   e. computing by said processor a Velocity indicator for a plurality of time horizons, using the equation:

$$\text{Velocity}(t) = \pm \sqrt{\frac{2|\Delta P_T|}{P}}$$

wherein vertical bars represent an absolute value of said target price spread at elapsed time t, and the direction of movement is indicated with a choice of sign, where Velocity represents the anticipated direction and speed of price movement;
   f. displaying saving, or retrieving one or more said security prices and price indicators via a provided user or client system interface.

2. The method of claim 1, wherein a multiplicity of factors and corresponding aggregated or reformulated measures can be substituted in said price equation.

3. The method of claim 1, further comprising the step of computing by said processor a support ratio indicator for a plurality of time horizons using the equation:

$$\text{Support Ratio}(t) = \frac{\sum_{n=1}^{N} \{s(n) * \Delta P_n\}}{S_{Total} * \Delta P}$$

wherein the numerator represents the new investment amount measured as a sum of investment gain/loss for each trade activity, N is the number of trades during an elapsed time t, $s_n * \Delta P_n$ is the gain/loss from a single trade activity n measured as a product of the number of traded shares $s_n$ and the difference between the sell price and the seller's cost basis or $\Delta P_n$, and $S_{Total} * \Delta P$ is the change in market capitalization measured as a product of the total number of outstanding shares for a security $S_{Total}$ and said expected price change.

4. The method of claim 3, further identifying by said processor a fully supported price level as the support ratio approaches 1 and the value of new investment amount approaches the change in market capitalization for a security, indicating that a stable price point is established.

5. The method of claim 3, wherein the support ratio is estimated by said processor using a multiplicity of related or aggregated factors from a group comprising of trading volume, price, number of shares outstanding, or combinations and variations thereof, where for a special case of a daily time interval new investment amount is estimated by multiplying the daily trade volume and the daily price change for a security and summing the product for each day during the elapsed time period t.

6. The method of claim 3, further computing by said processor an expected price indicator for a plurality of time horizons by adding an adjusted portion of said expected price change to said start-up price at elapsed time t or f(t), using a multiplicity of adjustment techniques using the equation:

$$\text{Expected Price}(t) = P_0 + \Delta P * f(t)$$

wherein f(t) represents the adjustment factor and for a special case of linear estimation f(t)=Support Ratio (t).

7. The method of claim 3, further comprising a step of computing by said processor an event time horizon indicator ΔT for a plurality of time horizons using a multiplicity of available regression and extrapolation techniques, taking into consideration said support ratio, elapsed time, and expected price change, or combinations and variations thereof, where for a special case of linear estimation the event time horizon is estimated using the equation:

$$\Delta T = \frac{t}{\text{Support Ratio }(t)}$$

wherein ΔT provides an estimate of the projected time from an event's onset until the target price is attained and a fully supported price level is established.

8. The method of claim 6, further comprising a step of computing by said processor a Price Channel indicator for a plurality of time horizons as the separation between said expected price and said target price, where the Price Channel represents the expected range for price movement of a security.

9. The method of claim 1, further comprising a step of computing by said processor a Momentum indicator for a plurality of time horizons, using the equation:

$$\text{Momentum}(t) = \pm\sqrt{2P|\Delta P_T|}$$

where Momentum represents the intensity or strength of price movement.

10. The method of claim 1, further comprising a step of computing by said processor a Money Flow indicator, measuring the aggregate amount of capital flowing into a security for a plurality of time horizons, by adding the new investment amount measured as a sum of investment gain/loss for each trade activity to the initial Money Flow Value $MF_0$, using the following equation, wherein N is the number of trades during an elapsed time t, $s_n * \Delta P_n$ is the gain/loss from a single trade activity n measured as a product of the number of traded shares $s_n$ and the difference between the sell price and the seller's cost basis or $\Delta P_n$, where said Money Flow indicator is a measure of investor sentiment towards the underlying security:

$$\text{Money Flow }(t) = MF_0 + \sum_{n=1}^{N} \{s_n * \Delta P_n\}.$$

11. The method of claim 10, wherein the Money Flow indicator is estimated by said processor using a multiplicity of related measures or aggregation techniques for a plurality of time horizons, where for a special case of daily measurements the Money Flow Indicators is estimated by using a product of daily trade volume and change in daily price and summing the result over the selected time period.

12. The method of claim 1, further comprising a step of computing by said processor a Liquidity indicator for a plurality of time horizons by adding the number of trades for a security and dividing the result by the total number of outstanding shares in a security, wherein said Liquidity indicator represents a normalized ratio of trading activity indicating the ease of trading in a security and the competitiveness of bid and ask prices, where a low Liquidity indicator value indicates a poorly traded security with a high level of associated liquidity risk, and where the inverse value represents a measure of share turn-over rate.

13. The method of claim 1, further comprising a step of computing by said processor the cumulative effect of multiple stand-alone or overlapping changes in said factors affecting a security's price through a superposition technique by combining said prices and price indicators.

14. The method in claim 13, wherein the superposition technique utilizes a range of available operators and weighting factors, comprising of one or more of addition, subtraction, linear or non-linear transformations, and time or value based weighting factors, or combinations and variations thereof.

15. The method in claim 1, comprising a step of providing access by said processor to one or more said security price and related price indicators via a user or client system interface, wherein the user or client system can input optional parameters, save, retrieve or view one or more said prices and price indicators, or interact with the security pricing tool.

16. The method of claim 1 further comprising steps of dynamically assessing the performance of one or more securities by said processor:
   a. interacting with said security pricing tool and receiving one or more said input data, target price, and price indicators;
   b. implementing a decision support tool by said processor;
   c. computing by said processor a plurality of investment rules and scenarios utilizing said input data, target price, and price indicators for a plurality of time horizons, generating investment opportunities or recommendations, creating and managing an investment portfolio for select securities, assessing and tracking security performance, or combinations and variations thereof;
   d. implementing a user or client system interface by said processor to input optional parameters, access said investment opportunities or recommendations, display or save said investment profile and portfolio, analyze or track security performance for a plurality of time horizons, or variations and combinations thereof.

17. The method in claim 16, further identifying, developing, or implementing security selection rules using said processor for a multiplicity of investment styles, wherein a multiplicity of evaluation and filtering criteria is used to identify and recommend select securities for each investment style by using threshold, frequency, and range values or filters for said input data, target price, and price indicators.

18. A security pricing system comprising:
one or more processors,
an input-output device,
a memory device containing code when executed by said processor causes said processor to implement steps comprising:
a. collecting and storing input data including historical data and optional projected data related to one or more securities;
b. implementing a security pricing tool based on a security pricing model;
c. computing by said processor a plurality of scenario prices and price indicators utilizing said input data for a plurality of time horizons as a function of a change in one or more factors affecting a security's price (P) from a group comprising of earnings per share (EPS), price to earnings (PE) ratio, or combinations and variations thereof, using the price equation P=EPS*PE and its partial differential form:

$$\Delta P = \Delta EPS * PE_0 + EPS_0 * \Delta PE$$

wherein $\Delta P$ is the expected price change, $\Delta EPS$ and $\Delta PE$ are measured, estimated, or projected change in earnings per share and price to earnings ratio, and $EPS_0$ and $PE_0$ are starting values for earnings per share and price to earnings ratio for an initial price point ($P_0$), wherein a target price is computed by adding said expected price change to said initial price, using the equation:

$$P_T = P_0 + \Delta P$$

e. computing by said processor a Divergence indicator for a plurality of time horizons as a ratio of the target price spread $\Delta P_T$ over the observed market price at elapsed time t, using the equation:

$$\text{Divergence } (t) = \frac{\Delta P_T}{P}$$

wherein $\Delta P_T = P_T - P$, with $P_T$ as said target price and P as the market price at elapsed time t, where Divergence represents the expected gain/loss opportunity for a security;
f. computing by said processor a Velocity indicator for a plurality of time horizons, using the equation:

$$\text{Velocity } (t) = \pm \sqrt{\frac{2|\Delta P_T|}{P}}$$

wherein vertical bars represent an absolute value of said target price spread at elapsed time t, and the direction of movement is indicated with a choice of sign, where Velocity represents the anticipated direction and speed of price movement;
d. displaying, saving, or retrieving one or more said security prices and price indicators via a provided user or client system interface.

19. The method in claim 17, comprising a further step of implementing by said processor a user or client system interface for creating and managing a portfolio of securities, tracking price movement and performance of said security selection, modifying selection list, managing cash, simulating investment selection, performing trade activity, analyzing gain/loss over a multitude of time horizons, or variations and combinations thereof.

20. A method for pricing goods or services or valuing assets using a general-purpose computer and one or more processors comprising: a) collecting and storing input data including historical data and optional projected data; b) implementing a pricing tool by said processor; c) computing by said processor a plurality of scenario prices, price indicators, or asset valuations utilizing said input data for a plurality of time horizons as a function of a change in at least one of the factors affecting price from a group comprising of earnings, price to earnings ratio, and combinations or variations thereof using the price equation P=E*PE and its partial differential form $\Delta P = \Delta E * PE_0 + E_0 * \Delta PE$; wherein earnings (E) and price to earnings ratio (PE) indicate estimated or projected profit and price to profit multiplier; wherein a target price or valuation is computed by adding said expected price change to said initial price, using the equation $P_T = P_0 + \Delta P$; d) computing by said processor a Divergence indicator for a plurality of time horizons as a ratio of the target price spread $\Delta P_T$ over the observed market price at elapsed time t, using the equation Divergence $(t) = \Delta P_T / P$ wherein $\Delta P_T = P_T - P$, with $P_T$ as said target price and P as the market price at elapsed time t, where Divergence represents the expected gain/loss opportunity for a security; e) computing by said processor a Velocity indicator for a plurality of time horizons, using the equation Velocity $(t) = \pm \sqrt{2|\Delta P_T|/P}$ wherein vertical bars represent an absolute value of said target price spread at elapsed time t, and the direction of movement is indicated with a choice of sign, where Velocity represents the anticipated direction and speed of price movement; and f) displaying or retrieving one or more said prices and price indicators via a provided user or client system interface.

21. The method of claim 20, wherein a multiplicity of factors and corresponding aggregated or reformulated measures can be substituted in said price equation.

* * * * *